US009128751B2

(12) United States Patent
Tokashiki

(10) Patent No.: US 9,128,751 B2
(45) Date of Patent: Sep. 8, 2015

(54) SCHEMA-BASED LINK PROCESSING

(75) Inventor: Mamoru Tokashiki, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/108,220

(22) Filed: May 16, 2011

(65) Prior Publication Data

US 2011/0296289 A1 Dec. 1, 2011

(30) Foreign Application Priority Data

May 25, 2010 (JP) ................................. 2010-119045

(51) Int. Cl.
*G06F 9/54* (2006.01)
*G06F 9/48* (2006.01)

(52) U.S. Cl.
CPC .............. *G06F 9/4843* (2013.01); *G06F 9/542* (2013.01); *G06F 2209/542* (2013.01)

(58) Field of Classification Search
CPC ..... G06F 11/3668; G06F 15/167; G06F 8/70; H04L 29/08153; H04L 63/0428; H04L 65/60; H04L 67/36; H04L 9/3263; H04N 21/27; H04N 21/4516; H04N 21/47217; H04N 21/65; H04N 21/8586
USPC .................................................. 715/205, 237
See application file for complete search history.

(56) References Cited

U.S. PATENT DOCUMENTS

| 5,987,611 | A | * | 11/1999 | Freund | 726/4 |
| 6,025,837 | A | * | 2/2000 | Matthews et al. | 715/721 |
| 6,035,330 | A | * | 3/2000 | Astiz et al. | 709/218 |
| 6,850,986 | B1 | * | 2/2005 | Peacock | 709/232 |
| 7,277,408 | B2 | * | 10/2007 | Sorsa | 370/328 |
| 7,437,149 | B1 | * | 10/2008 | Papineau et al. | 455/418 |
| 7,818,340 | B1 | * | 10/2010 | Warren | 707/771 |
| 2003/0023752 | A1 | * | 1/2003 | Williamson et al. | 709/245 |
| 2006/0242712 | A1 | * | 10/2006 | Linn et al. | 726/26 |
| 2006/0253459 | A1 | * | 11/2006 | Kahn et al. | 707/10 |
| 2007/0130122 | A1 | * | 6/2007 | Warren | 707/3 |
| 2008/0320328 | A1 | * | 12/2008 | O'Leary | 714/25 |
| 2009/0015599 | A1 | * | 1/2009 | Bennett et al. | 345/680 |
| 2009/0100321 | A1 | | 4/2009 | Singh et al. | |

(Continued)

FOREIGN PATENT DOCUMENTS

EP 1 489 505 A2 12/2004

OTHER PUBLICATIONS

Shelley O'Hara; Easy Microsoft Windows XP Home Edition; Aug. 5, 2003; Que Publishing; Second Edition; p. 69.*

(Continued)

*Primary Examiner* — Andrew Dyer
(74) *Attorney, Agent, or Firm* — Wolf, Greenfield & Sacks, P.C.

(57) ABSTRACT

An apparatus includes a processing unit configured to determine, using a control application, a type of schema of a selected link. When the schema is of a first type, the control application causes processing associated with the selected link to be performed by a content display module. When the schema is of a second type, the control application causes processing associated with the selected link to be performed by a module different from the content display module. The processing unit can be configured to run an operating system, a control application, and a content display module, such that the control application is interposed between the operating system and the content display module. The control application can determine a type of schema of a selected link.

6 Claims, 8 Drawing Sheets

(56) References Cited

U.S. PATENT DOCUMENTS

2009/0313256 A1* 12/2009 Konduri et al. ............... 707/10
2011/0246059 A1   10/2011 Tokashiki
2012/0254309 A1   10/2012 Tokashiki

OTHER PUBLICATIONS

Berners-Lee, et al., Uniform Resource Identifier (URI): Generic Syntax; Request for Comments: 3986; Jan. 2005; The Internet Society; pp. 1-62.*
Schema; Microsoft Computer Dictionary; May 1, 2002; Fifth Edition; p. 583.*
Ivanov; API Hooking Revealed; Apr. 5, 2002; CodeProject; pp. 1-16.*
Nivas; Understanding URLs>Type of URLs Schemes; May 10, 2004; Layout Galaxy; pp. 1-3.*
Barton et al.; "The World Wide Web;" Fozziliny George Moo's Guide to the World Wide Web; Feb. 1, 2001; pp. 1-7.*
Deitel et al.; Java How to Program; Dec. 27, 2006; Prentice Hall; Seventh Edition; pp. 21-22 and XCI-XCII.*
Andrew Tanenbaum; Structured Computer Organization; 1984; Prentice-Hall, Inc.; Second Edition; pp. 10-12.*
Interpose; Dec. 3, 2008; Merriam-Webster.com; pp. 1-2.*
Fetch Help > Fetch Tutorial > Getting a File; Aug. 11, 2009; fetchsoftworks.com; p. 1.*
Macintosh System 7.5 reviewed; Feb. 3, 2002; pp. 1-5.*
Gregoire, How to Handle Custom URL Protocols with the Microsoft WebBrowser Control. [Marc Gregoire's Blog]. Accessed online Apr. 5, 2010. 2 pages.

* cited by examiner

FIG. 8

| PROCESSING | SCHEMA NOTATION | ADDITIONAL DATA | OTHER PROCESSING |
|---|---|---|---|
| TRANSMISSION | tms:// | CONTENT URI, REPRODUCTION START POSITION, D&D ICON URI | ICON ACQUISITION OR PULL-DOWN MENU UPON SELECTION |
| RETRANSMISSION | play:// | CONTENT URI, REPRODUCTION START POSITION, D&D ICON URI | TRANSMISSION PROCESSING UPON HOLDING |
| DIRECT DATA TRANSMISSION | send:// | TARGET DEVICE ADDRESS, COMMAND | UI CHANGE OF TRANSMISSION OR RESPONSE |
| READING OF OTHER CONTENT LISTS | open:// | CONTENT LIST ID, LAYOUT XMLID (WHEN CHANGE IS MADE) | REFRESHING OF LAYOUT XML |

SCHEMA-BASED LINK PROCESSING

BACKGROUND

1. Technical Field

The techniques described herein relate to an information processing device, a content display method, and a computer program.

2. Description of the Related Art

It is necessary for a web server to use application software capable of interpreting hypertext markup language (HTML), for example, a web browser, so as to display content (hereinafter, also referred to as "HTML content") created using HTML by a personal computer or mobile phone.

Recently, a range of functions for HTML content has increased. Content capable of being displayed as the HTML content has a wide range including music, still images, moving images, and the like as well as text. For example, moving images included in the HTML content may be reproduced on a web browser executable in a personal computer or a mobile phone by a user's manipulation.

SUMMARY

However, the HTML content of the related art has been mainly used in a page unit, and has been built within a single page even in a wide range of functions. If the HTML content is built within a single page, there is a problem in that it is difficult to exchange data over a page and, particularly, it is significantly difficult to build a user interface over a page.

It is necessary to build complex HTML content so as to realize various functions in a single page. Since all scripts for causing a browser to display the HTML content are executed in the same execution environment, there is a problem in terms of security.

In light of the foregoing, it is desirable to provide a novel and improved information processing device, content display method, and computer program that can seamlessly link content described by a predetermined markup language like HTML content with a function to be executed by manipulation of the content.

In some exemplary embodiments, the control application determines which module to perform the processing associated with the link based on whether the link schema can be processed by the content display module or whether by the control application in the above-described exemplary embodiment, but the embodiments are not limited to this example. The control application can determine which module to perform the processing based on other criteria, such as association information that associates each schema type with a module to perform the processing.

Some exemplary embodiments relate to an apparatus that includes a processing unit configured to determine, using a control application, a type of schema of a selected link. When the schema is of a first type, the control application causes processing associated with the selected link to be performed by a content display module. When the schema is of a second type, the control application causes processing associated with the selected link to be performed by a module different from the content display module. The control application is separate from the content display module.

Some exemplary embodiments relate to a method of processing based on a selected link. The method includes determining, using a control application, a type of schema of the selected link. When the schema is of a first type, the control application causes processing associated with the selected link to be performed by the content display module. When the schema is of a second type, the control application causes processing associated with the selected link to be performed by a module different from the content display module. The control application is separate from the content display module.

Some exemplary embodiments relate to a computer readable storage medium having stored thereon instructions, which, when executed, perform the above method. For example, the computer readable storage medium can be a tangible and/or non-transitory computer readable storage medium such as a disc or computer memory, for example.

Some exemplary embodiments relate to an apparatus that includes a memory and a communication device. The memory stores content including a first link of a first type of schema and a second link of a second type of schema. The communication device is configured to send the first and second links to at least one second apparatus over a network such that a control application of the at least one second apparatus causes processing associated with the first link to be performed by a content display module and causes processing associated with the second link to be performed by a module different from the content display module. The control application is separate from the content display module.

Some exemplary embodiments relate to a method that includes storing content including a first link of a first type of schema and a second link of a second type of schema. The method also includes sending the first and second links to at least one second apparatus over a network such that a control application of the at least one second apparatus causes processing associated with the first link to be performed by a content display module and causes processing associated with the second link to be performed by a module different from the content display module. The control application is separate from the content display module.

Some exemplary embodiments relate to an apparatus that includes a processing unit configured to run an operating system, a control application, and a content display module. The control application is separate from the operating system and the content display module. The control application is interposed between the operating system and the content display module. The control application determines a type of schema of a selected link.

According to the techniques described herein, it is possible to provide a novel and improved information processing device, content display method, and computer program that can seamlessly link content described by a predetermined markup language like HTML content with a function to be executed by manipulation of the content.

BRIEF DESCRIPTION OF THE DRAWINGS

FIG. 8 is an illustrative diagram showing an example of an independent protocol schema predefined by a content providing system 1 according to an exemplary embodiment.

DETAILED DESCRIPTION OF THE EXEMPLARY EMBODIMENT(S)

Figure 1:
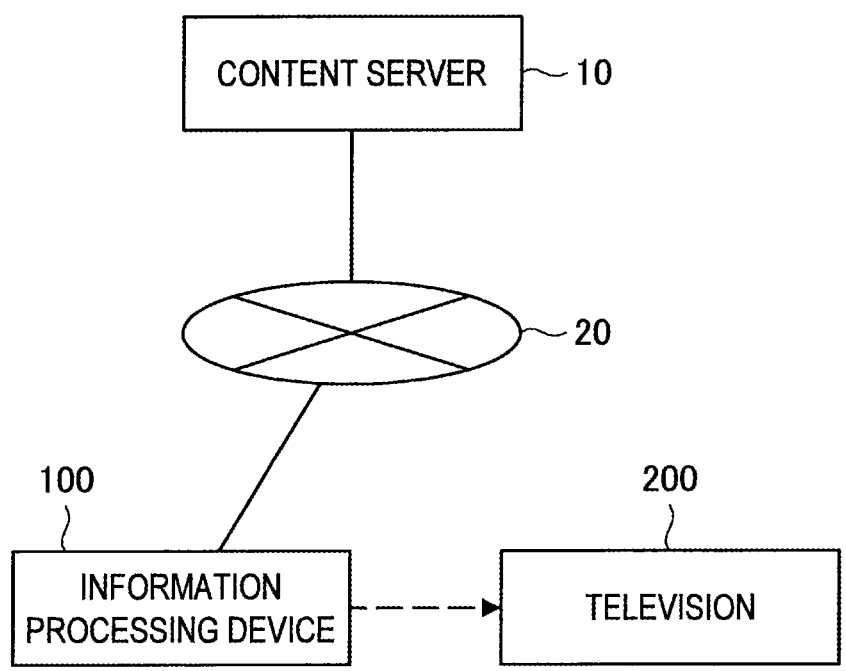
FIG. 1 is an illustrative diagram showing a configuration example of a content providing system including an information processing device according to an exemplary embodiment.

Hereinafter, preferred exemplary embodiments will be described in detail with reference to the appended drawings. Note that, in this specification and the appended drawings, structural elements that have substantially the same function and structure are denoted with the same reference numerals, and repeated explanation of these structural elements is omitted.

Description will be given in the following order.
<1. An Exemplary Embodiment>
[1-1. Configuration Example of Content Providing System]
[1-2. Configuration Example of Information Processing Device]
[1-3. Layer Structure]
[1-4. Display Example of HTML Content]
[1-5. Operation Example of Information Processing Device]
<2. Summary>
<1. An Exemplary Embodiment>
[1-1. Configuration Example of Content Providing System]

First, a configuration example of a content providing system including an information processing device according to an exemplary embodiment will be described. FIG. 1 is an illustrative diagram showing the configuration example of the content providing system including the information processing device according to the exemplary embodiment. Hereinafter, the configuration example of the content providing system including the information processing device according to the exemplary embodiment will be described with reference to FIG. 1.

As shown in FIG. 1, a content providing system 1 according to an exemplary embodiment includes a content server 10 and an information processing device 100.

The content server 10 is a server that generates HTML content, which is content by HTML as an example of a predetermined markup language that may be used, and provides the generated HTML content to the information processing device 100. The content server 10 generates appropriate HTML content via a network 20 in response to a request from the information processing device 100, and transmits the HTML content to the information processing device 100.

The information processing device 100 is a device that displays HTML content provided from the content server 10. The information processing device 100 may execute various functions of displaying the HTML content provided from the content server 10 and receiving input manipulation from the user.

For example, if the user selects a thumbnail image of moving image content displayed as HTML content provided from the content server 10, the information processing device 100 may reproduce the moving image content. The information processing device 100 may also control a television 200 to reproduce the selected moving image content by establishing a link with the television 200 in advance. Detailed description of link processing of the information processing device 100 and the television 200 is omitted.

The configuration example of the content providing system including the information processing device according to an exemplary embodiment has been described above with reference to FIG. 1. Next, a configuration example of the information processing device 100 according to an exemplary embodiment will be described.

[1-2. Configuration Example of Information Processing Device]

Figure 2:
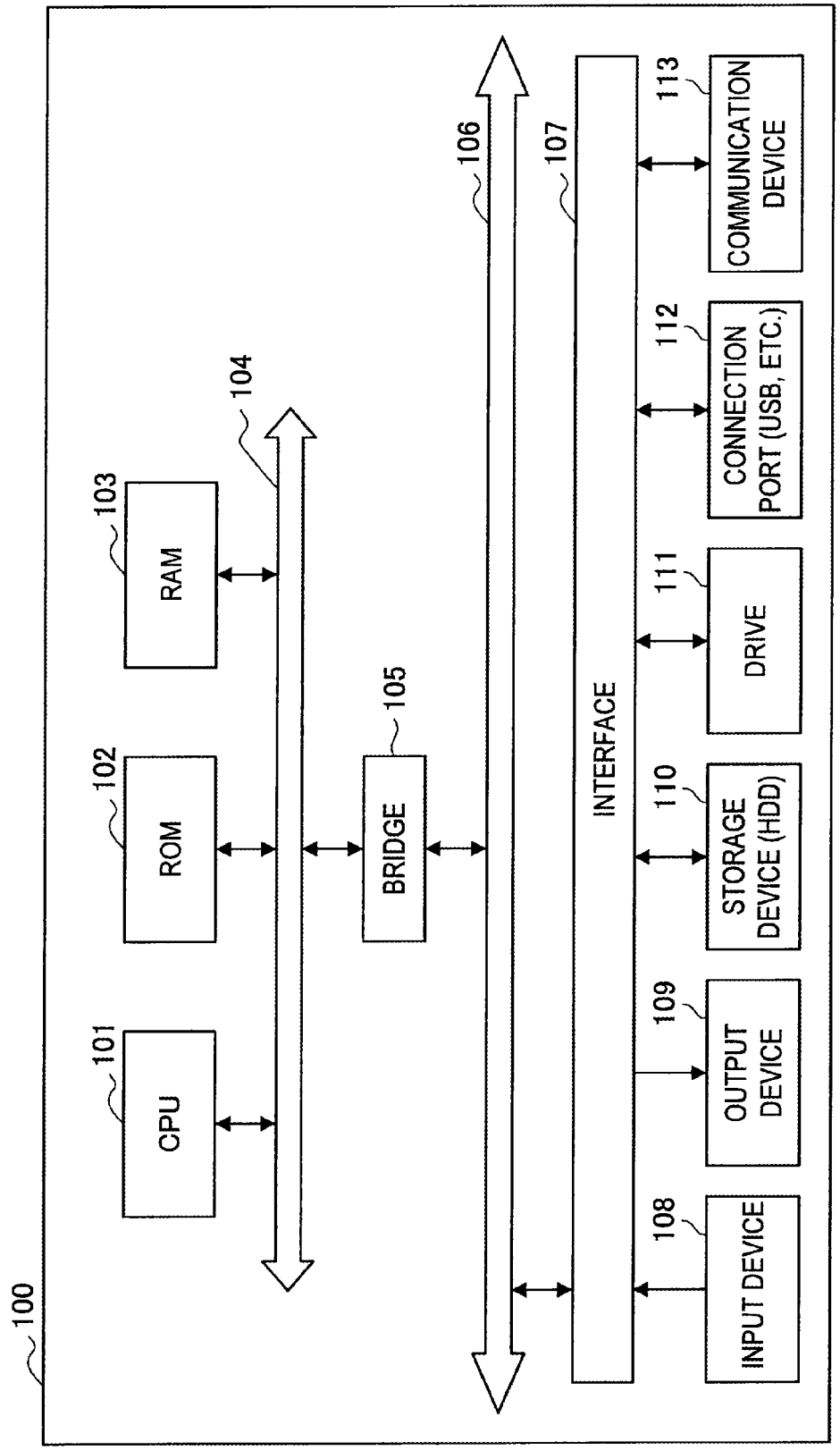
FIG. 2 is an illustrative diagram showing a functional configuration of an information processing device 100 according to an exemplary embodiment.

FIG. 2 is an illustrative diagram showing a functional configuration of the information processing device 100 according to some exemplary embodiments. Hereinafter, the functional configuration of the information processing device 100 according to some exemplary embodiments will be described using FIG. 2.

For example, the information processing device 100 may be a personal computer. In this case, as shown in FIG. 2, the information processing device 100 has, for example, a central processing unit (CPU) 101, a read only memory (ROM) 102, a random access memory (RAM) 103, buses 104 and 106, a bridge 105, an interface 107, an input device 108, an output device 109, a storage device 110, such as a hard disk drive (HDD) or the like, a drive 111, a connection port 112, such as a universal serial bus (USB) or the like, a communication device 113, etc. These configurations are connected to each other so that information may be delivered via the buses 104 and 106 connected by the bridge 105 or the interface 107, etc.

For example, a program may be recorded on the storage device 110 such as an HDD or a solid state drive (SSD) which is an example of a recording device, the ROM 102, the RAM 103, or the like.

For example, the program may be temporarily or permanently recorded on a magnetic disk such as a flexible disk, optical discs such as a variety of a compact disc (CD)/magneto optical (MO) disc/digital versatile disc (DVD), or a removable storage medium such as a semiconductor memory (not shown). The removable storage medium may be provided as so-called package software. The program recorded on the removable storage medium may be read by the drive 111 and recorded on the recording device via the interface 107 or the buses 104 and 106.

Further, for example, the program may be recorded on a download site/another computer/another recording device (not shown), or the like. In this case, the program is transmitted via a network (not shown) such as a local area network (LAN)/Internet, so that the communication device 113 receives the program. The program may be transmitted from another recording device or communication device or the like connected to the connection port 112 such as a USB or the like. The program received by the communication device 113 or the connection port 112 may be recorded on the recording device via the interface 107, the buses 104 and 106, or the like.

The CPU 101 executes various types of processing according to the program recorded on the above-described recording device, so that the series of processing is realized. In this case, for example, the CPU 101 may directly read and execute the program from the recording device, or may execute the program after loading the program to the RAM 103 once. Further, for example, if the program is received via the communication device 113 or the drive 111, the CPU 101 may directly execute the program without recording the received program on the recording device.

Further, for example, the CPU 101 may execute various types of processing on the basis of a signal or information input from the input device 108 such as a mouse/keyboard/microphone (not shown) or another input device connected to the connection port 112, if necessary.

The CPU 10 may output a result obtained by executing the above-described series of processing, for example, from a display device such as a monitor or the output device 109 such as an audio output device including a speaker or a headphone. Further, the CPU 101 may transmit the processing result from the communication device 113 or the connection port 112 if necessary, or may record the processing result on the above-described recording device or removable recording medium.

The information processing device 100 may display HTML content provided from the content server 10 on the output device 109. Accordingly, in the information processing device 100, a program (for example, a web browser; this program is simply described as the web browser in the following description) capable of interpreting HTML is stored in the above-described storage device 110, the ROM 102, the RAM 103, or the like.

The input device 108 may include a touch panel in which an input instruction is possible by touching a display device such as a monitor with a finger or the like. When the touch panel is provided in the input device 108, the user of the information processing device 100 can manipulate HTML content displayed on the output device 109 by directly touching a display device with a finger or the like.

Since the user of the information processing device 100 displays HTML content provided from the content server 10 on the output device 109, the information processing device 100 executes the web browser. If the information processing device 100 executes the web browser, the web browser can display the HTML content acquired from the content server 10 on the output device 109.

The function of the information processing device 100 according to some exemplary embodiments has been described above using FIG. 2. The configuration in which the information processing device 100 is a personal computer and the storage device 110 or the drive 111 is provided inside the information processing device 100 has been illustrated in this exemplary embodiment, but embodiments are not limited to this example. For example, a type in which the storage device 110 or the drive 111 is not provided is possible if the information processing device 100 is a small-size portable device like a mobile phone, but the techniques described herein are also equally applicable to the above-described device.

[1-3. Layer Structure]

Figure 3:
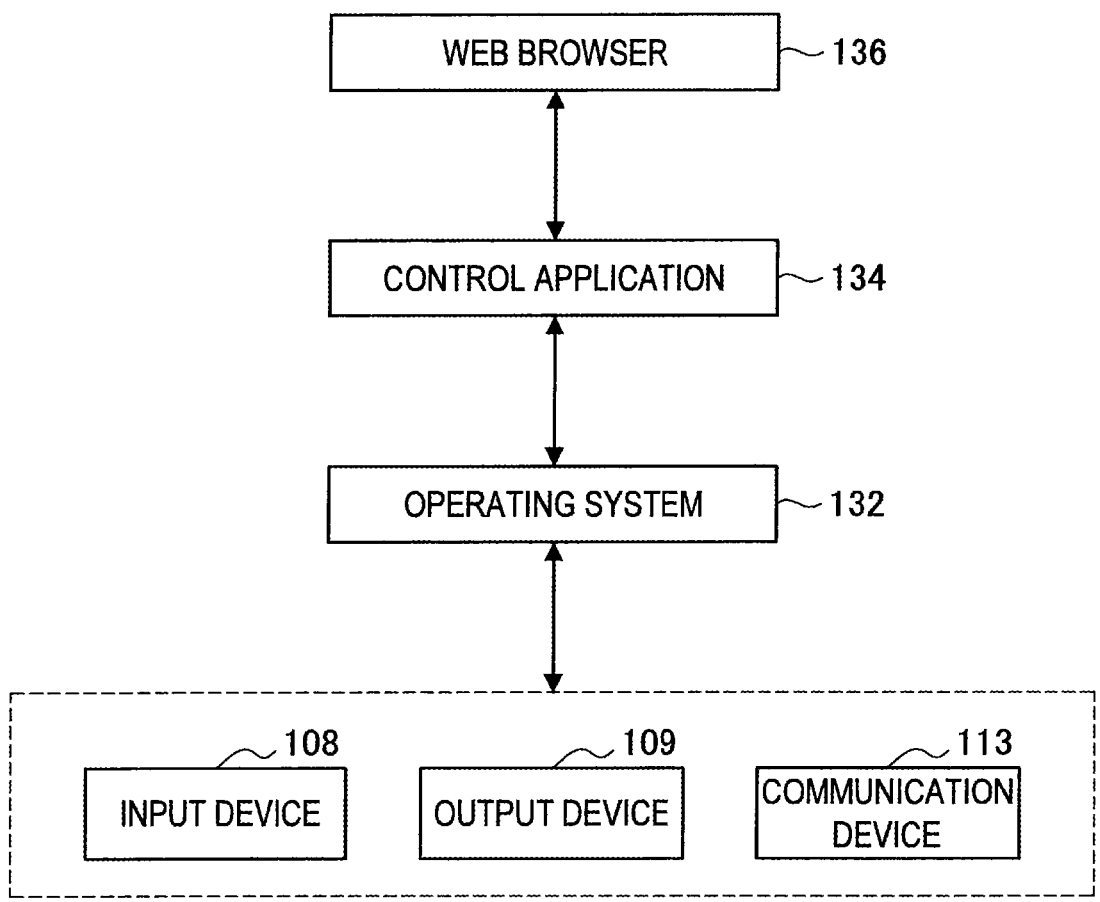
FIG. 3 is an illustrative diagram showing a layer structure of a program to be executed by the information processing device 100 according to an exemplary embodiment.

Next, a layer structure of a program to be executed by the information processing device 100 according to the exemplary embodiment will be described. FIG. 3 is an illustrative diagram showing the layer structure of the program to be executed by the information processing device 100 according to the exemplary embodiment.

In the information processing device 100 according to some exemplary embodiments, an operating system 132, which is software for providing a hardware interface to various types of application software and is an example of basic software according to some exemplary embodiments, is executed. In the information processing device 100, a control application 134 is executed by an upper layer of the operating system 132. In the information processing device 100, a web browser 136 for displaying HTML content on the output device 109 is executed by an upper layer of the control application 134.

In general, in the same layer as that of the control application 134, the web browser 136 exchanges information with the operating system 132. That is, if the user manipulates the web browser 136 with use of the input device 108 in a state in which the web browser 136 displays the HTML content on the output device 109, input information of the user is transmitted from the operating system 132 to the web browser 136. The web browser 136 executes processing corresponding to the input information of the user, for example, the transition to another page, the reproduction of selected content, or the like.

The HTML content can provide functions by a flexible content layout, design, and script in a text base, and is suitable for automatic generation in a server site (a configuration for each user).

However, the HTML content of the related art is mainly used in a page unit and the HTML content is built within a single page even in a wide range of functions as described above. Accordingly, if the HTML content is built within the single page, there is a problem in that it is difficult to exchange data over a page and, particularly, it is significantly difficult to build a user interface over a page.

There is a method of displaying content by a dedicated application by making a change to display HTML content in the web browser 136. If this method is used, there is an advantageous effect in that it is easy to display content at a high speed, integrate user interfaces, or establish functional linking with other devices. However, on the other hand, it is necessary to newly develop an application on a case-by-case basis if a specification change or a design change is made. Since a framework of HTML content is fixed, the expressive power has a limitation as compared to HTML content display of the web browser 136.

In this exemplary embodiment as shown in FIG. 3, a layer in which the control application 134 is executed is interposed between the operating system 132 and the web browser 136. If the information processing device 100 displays HTML content, the control application 134 is executed from the operating system 132, and further, the web browser 136 is executed from the control application 134.

If the user selects a hyperlink on HTML content displayed on the web browser 136, appropriate processing corresponding to a schema of a protocol of the hyperlink (hereinafter, also referred to as a "protocol schema") is executed.

By inserting the layer in which the control application 134 is executed, the information processing device 100 can display content obtained by combining the advantages of both of content creation by HTML and content creation by a dedicated application.

The layer structure of a program to be executed by the information processing device 100 according to some exemplary embodiments has been described above. Next, a display example of HTML content displayed by the information processing device 100 according to an exemplary embodiment will be described.

[1-4. Display Example of Html Content]

Figure 4:
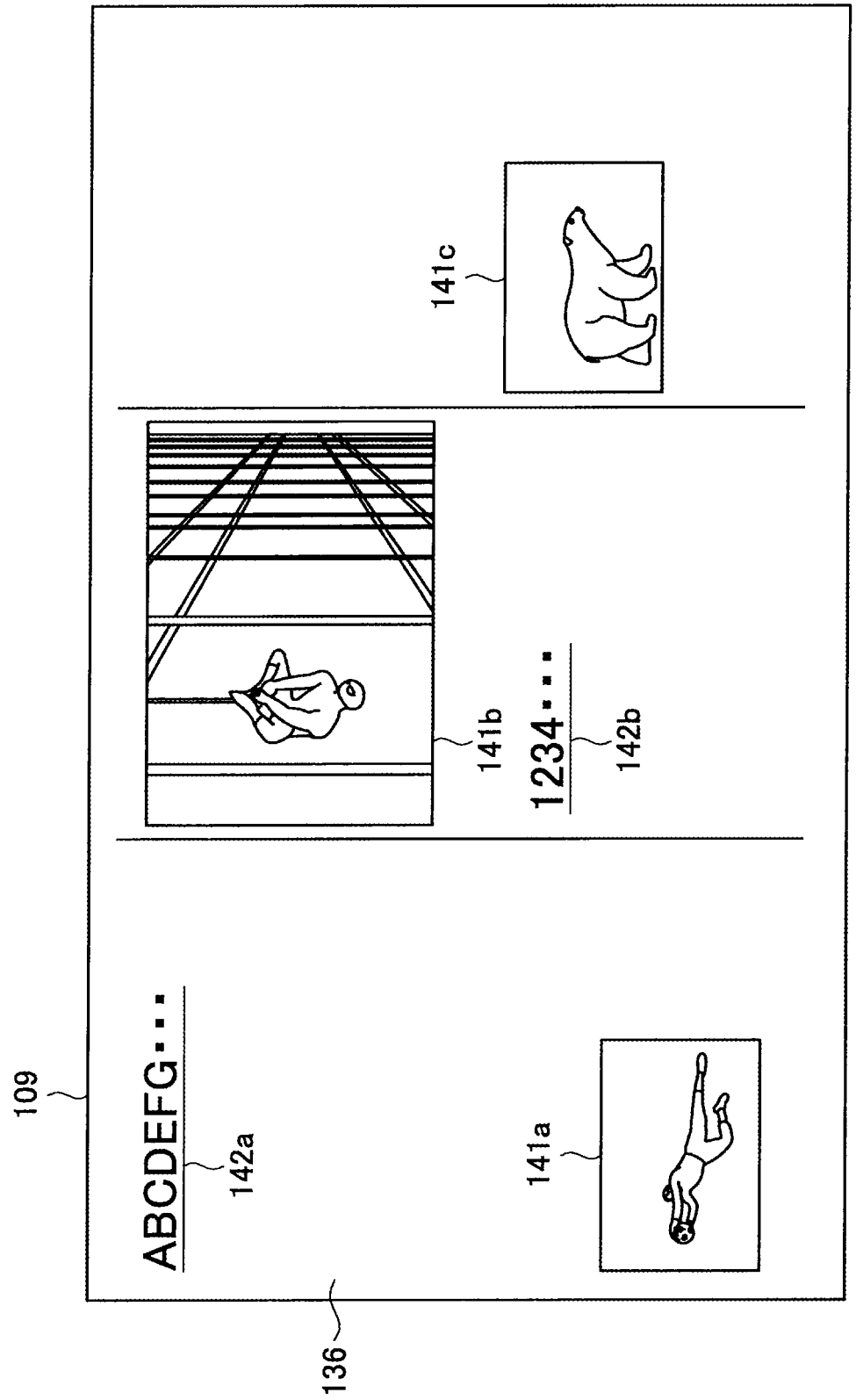
FIG. 4 is an illustrative diagram showing a display example of HTML content displayed on an output device 109.

FIG. 4 is an illustrative diagram showing a display example of HTML content displayed on the output device 109. Hereinafter, the display example of HTML content displayed on the output device 109 will be described using FIG. 4.

A screen shown in FIG. 4 shows a state in which the web browser 136 displays HTML content on the output device 109. The HTML content includes thumbnail images 141a, 141b, and 141c and text links 142a and 142b. Their link destinations are all designated by hyperlinks.

In this exemplary embodiment, the control application 134 interprets a protocol schema of a selected hyperlink if the user selects the thumbnail image 141a, 141b, or 141c or the text link 142a or 142b. The control application 134 executes internal processing, or passes processing to the web browser 136 or the operating system 132, by a difference in a protocol schema.

Although a state in which the control application 134 is executed is not explicitly shown in FIG. 4, the control application 134 is executed in a background, and the control application 134 is displayed on a screen if necessary, when the user manipulates the web browser 136.

In the content server 10, various protocol schemas are embedded into HTML content. For example, there is a protocol schema for the transition to another page, a protocol schema for reproducing designated content, a protocol schema for transmitting designated content to other devices, a protocol schema for directly transmitting designated content, a protocol schema for reading other content lists, and the like in the protocol schema.

A protocol schema defined for content transmission/reception like "http://~" or "https://~" in which content is transmitted by a hypertext transfer protocol (HTTP) is present in the protocol schema, but a hyperlink by an independent protocol schema capable of being interpreted by the control application 134 other than a predetermined protocol schema as described above is embedded into HTML content and is provided from the content server 10 to the information processing device 100 in this exemplary embodiment.

Figure 5:
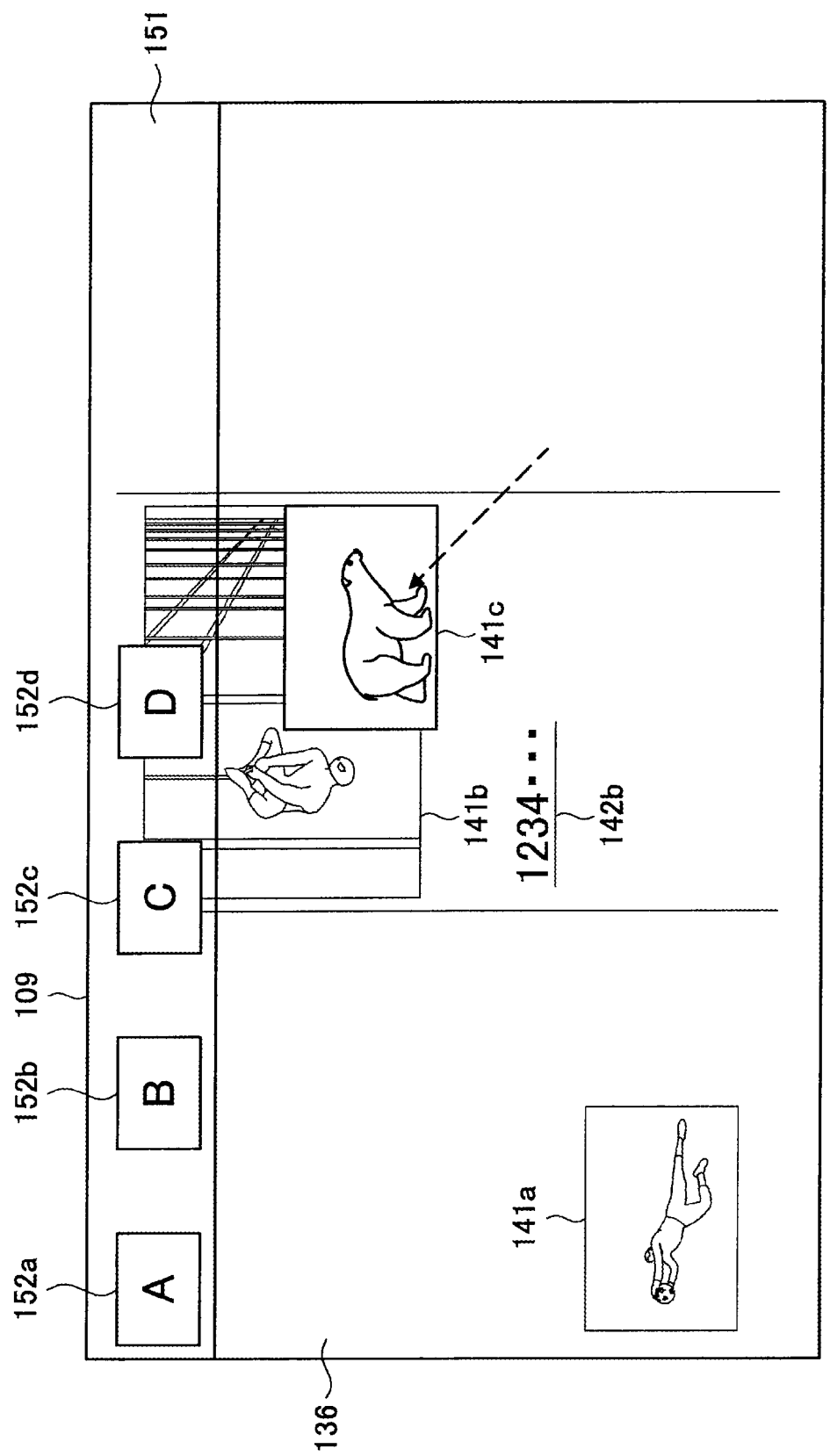
FIG. 5 is an illustrative diagram showing a display example of the output device 109 when a user selects a thumbnail image 141c in the display example of HTML content shown in FIG. 4.

A specific operation example of the information processing device 100 will be described. FIG. 5 is an illustrative diagram showing a display example of the output device 109 when the user selects the thumbnail image 141c in a display example of HTML content shown in FIG. 4.

The input device 108 is used to allow the user to select the thumbnail image 141c, but the user can select the thumbnail image 141c by making direct contact with the output device 109 by a finger or the like if a touch panel is included in the input device 108.

If the user selects the thumbnail image 141c, the control application 134 interprets a protocol schema of a hyperlink of the thumbnail image 141c. The control application 134 determines whether to independently continue processing, or whether to pass processing to the web browser 136 or the operating system 132, by a difference in a protocol schema.

For example, if a protocol schema of a hyperlink designated by the thumbnail image 141c is for transmitting designated content to other devices and the user selects the thumbnail image 141c, the control application 134 displays the thumbnail image 141c as an icon on the output device 109. In this case, the control application 134 or the operating system 132 may control display so that the display of the web browser 136 is softened as shown in FIG. 5. When the display of the web browser 136 is controlled as described above, a visual effect that looks like the thumbnail image 141c is lifted from the web browser 136 can be given to the user In a state in which the thumbnail image 141c is selected by the user of the information processing device 100, the control application 134 is displayed on the output device 109 as shown in FIG. 5. In the control application 134 according to this exemplary embodiment, the drag manipulation by the user of the information processing device 100 is possible on the screen of the thumbnail image 141c.

In a state in which the thumbnail image 141c is selected by the user of the information processing device 100, the control application 134 displays a functional link region 151 as shown in FIG. 5 on the output device 109. In the functional link region 151, executable processing for content selected by the user in HTML content is displayed in an icon type. In an example shown in FIG. 5, function execution icons 152a to 152d are displayed in the functional link region 151. The control application 134 may display a different function execution icon in the functional link region 151 in response to a protocol schema of designated content.

For example, the function execution icon 152d is an icon for executing icon transmission directed to the television 200 linked in advance with the information processing device 100. In this case, if the thumbnail image 141c, which is selected by the user of the information processing device 100 and is displayed as an icon, is dragged and dropped to the function execution icon 152d, the control application 134 executes processing of transmitting content corresponding to the thumbnail image 141c to the television 200. The television 200 receiving content transmitted from the information processing device 100 executes content reproduction processing.

If the user of the information processing device 100 drops the thumbnail image 141c displayed as the icon in a place where nothing is present, the control application 134 releases the display to its own output device 109 in response to the drop operation. If the display of the control application 134 is released, a display state of the output device 109 returns to the display of HTML content by the web browser 136 shown in FIG. 4.

By linking the web browser 136 and the control application 134 as described above, it is possible to display content obtained by combining advantages of both content creation by HTML and content creation by a dedicated application on the output device 109.

The display example of HTML content displayed by the information processing device 100 according to some exemplary embodiments has been described above. Next, an operation of the information processing device 100 according to an exemplary embodiment will be described.

[1-5. Operation Example of Information Processing Device]

Figure 6:
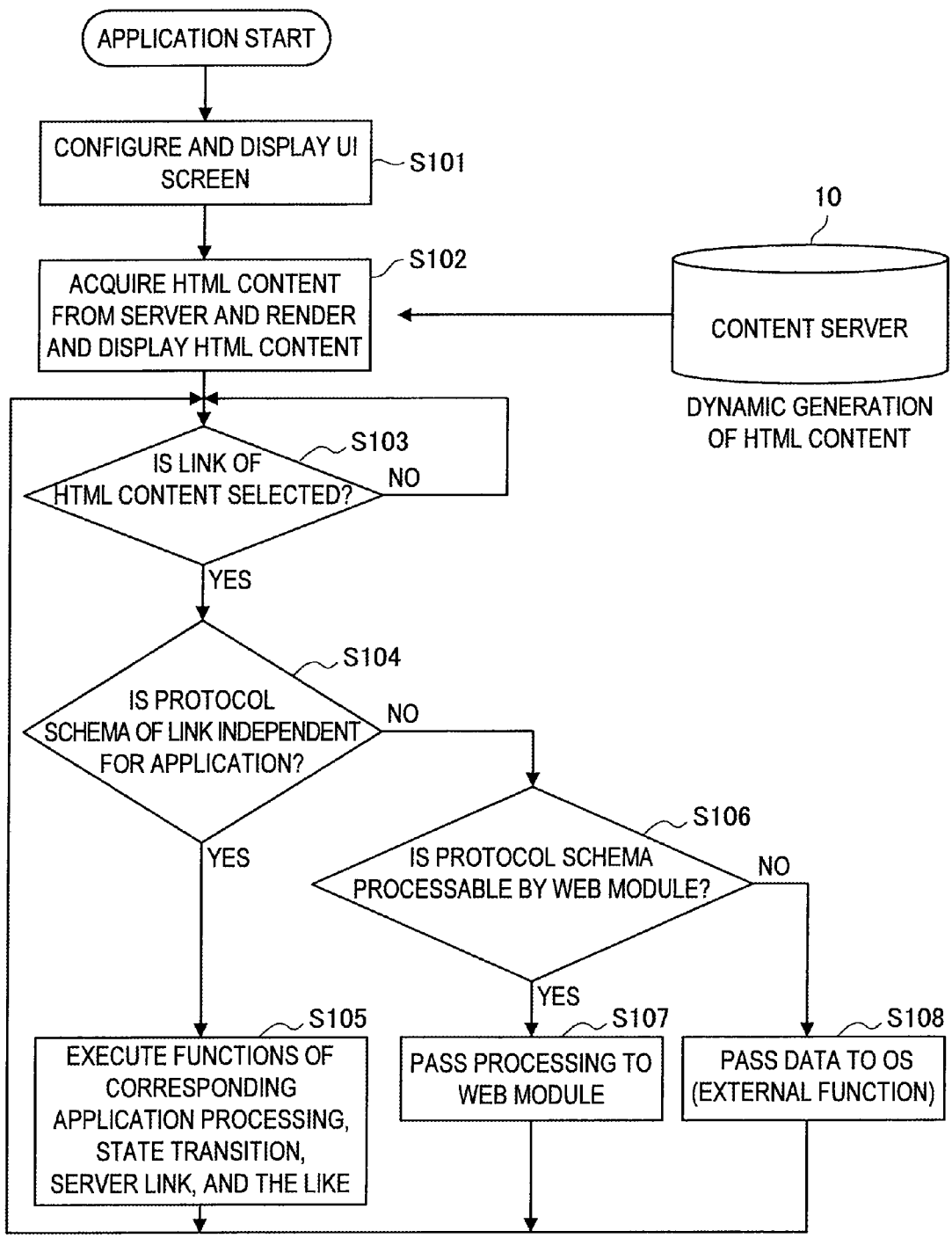
FIG. 6 is a flowchart showing an operation of the information processing device 100 according to an exemplary embodiment.

FIG. 6 is a flowchart showing the operation of the information processing device 100 according to some exemplary embodiments. Hereinafter, the operation of the information processing device 100 according to some exemplary embodiments will be described using FIG. 6.

If the control application 134 is started by the user of the information processing device 100, the control application 134 first configures a user interface (UI) screen and displays the UI screen on the output device 109 (step S101). The UI screen of the control application 134 may not be displayed on the output device 109 in a state in which the web browser 136 displays HTML content as described above.

If the UI screen of the control application 134 is displayed on the output device 109, the control application 134 causes the web browser 136 to acquire HTML content from the content server 10 (step S102).

The content server 10 dynamically generates HTML content and transmits the HTML content to the information processing device 100. For example, the content server 10 may generate appropriate content corresponding to the user using the information processing device 100 by referring to preference information or friend information of the user, device information of the information processing device 100, and the like, if the HTML content is generated.

If the web browser 136 displays HTML content acquired from the content server 10 on the output device 109, the control application 134 waits for the user of the information processing device 100 to select a hyperlink embedded into HTML content (step S103).

If the user of the information processing device 100 senses that the user of the information processing device 100 selects a hyperlink embedded into HTML content, the control application 134 determines whether or not a protocol schema of the hyperlink selected by the user of the information processing device 100 is an independent protocol schema defined for an operation of the control application 234 (step S104).

Figure 7:
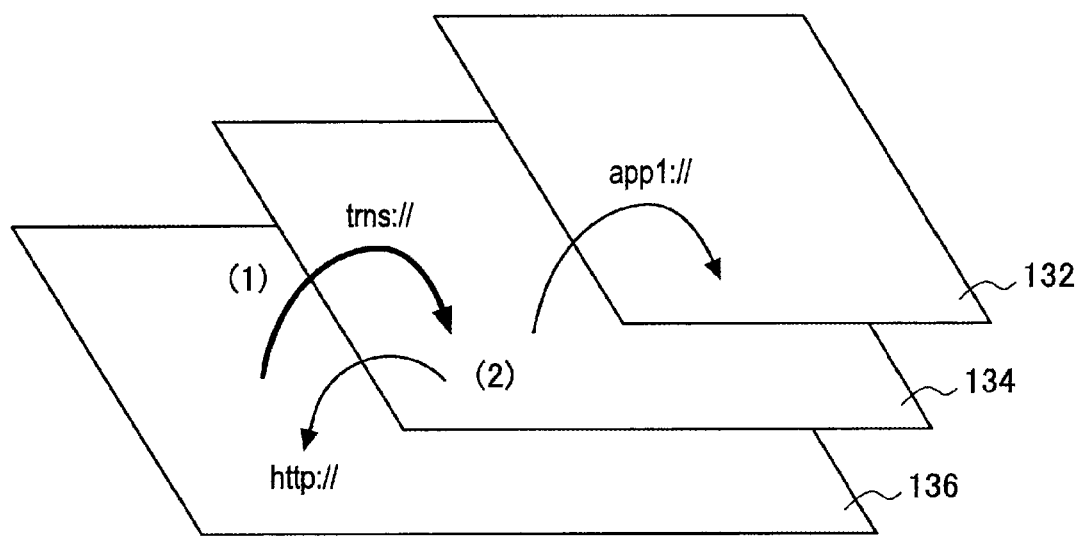
FIG. 7 is an illustrative diagram showing a determination structure of a protocol schema by a control application 134.

FIG. 7 is an illustrative diagram showing a determination structure of a protocol scheme by the control application 134. The determination structure of the protocol schema by the control application 134 will be described using FIG. 7. If the user of the information processing device 100 selects a hyperlink included in the HTML content, the control application 134 performs a hook operation once before processing is passed to the operating system 132. The control application 134 determines whether or not the protocol schema of the hyperlink is a protocol schema to be processed in an external application or function via a framework (or operating system).

For example, the protocol schema of the hyperlink may be preset in the control application 134 to determine whether or not the protocol schema of the hyperlink is an independent protocol schema defined for the operation of the control application 134. The protocol schema of the hyperlink may have a type in which information of the protocol schema is read from a described setting file or the like so as to improve the facilitation of an extension/change of the independent protocol schema.

By using the protocol schema in operation control of the control application 134 as described above, three parties of the operating system 132, the control application 134, and the web browser 136 can be linked by only the HTML hyperlink.

FIG. 8 is an illustrative diagram showing an example of an independent protocol schema predefined by the content providing system 1 according to an exemplary embodiment.

For example, a schema notation of "trns://" may be used as a protocol schema for transmitting content to other devices. As additional data, information of a content uniform resource identifier (URI), a content reproduction start position, a drag and drop (D&D) icon URI, and the like may be designated. If the user of the information processing device 100 selects a hyperlink by the schema notation "trns://," the control application 134 may display a pull-down menu if necessary in addition to the acquisition of a D&D icon.

For example, a schema notation of "play://" may be used as a protocol schema for reproducing content. As additional data, information of a content URI, a content reproduction start position, a D&D icon URI, and the like may be designated. If the user of the information processing device 100 selects a hyperlink by the schema notation of "play://," the control application 134 may execute, for example, processing different from reproduction when a link is pressed and held, for example, processing of transmitting the content to other devices, in addition to the reproduction of designated content.

For example, a schema notation of "send://" may be used as a protocol schema for directly transmitting content to other devices. As additional data, a target device address, a transmission command, or the like may be designated. If the user of the information processing device 100 selects a hyperlink by the schema notation of "send://," the control application 134 may display a user interface on the output device 109 when there is a response from another device upon transmission in addition to the transmission of designated content to other devices.

A schema notation of "open://" may be used as a protocol schema for reading other content lists. As additional data, a layout XML ID specifying a layout XML in which a design of HTML content is defined may be designated if the design of HTML content is changed in addition to a content list ID specifying a content list. If the user of the information processing device 100 selects a hyperlink by the schema notation of "open://," the control application 134 may refresh the layout XML designated by the layout XML ID, for example, if the design of HTML content is changed, in addition to an operation of displaying a designated content list.

In the layout XML, for example, a background image of HTML content, a size and an initial position of the HTML content, an icon image serving as a target to be dragged, an arrangement, address information of a transmission destination for transmission at the time of a drop operation, and the like may be described. Like the HTML content, the layout XML may also be generated by the content server 10. The layout XML may be generated from the user's hobbies and likes, an installation situation of the information processing device 100, or the like in the content server 10.

An example in which an independent protocol schema uses a different schema notation in response to processing has been described above, but exemplary embodiments are not limited to this example. For example, schema notations of the independent protocol schema may be integrated into one, and a type of designating an operation by a difference in additional data may be taken.

If the protocol schema of the hyperlink selected by the user of the information processing device 100 is independently defined by the content providing system 1 without a predefined HTTP or the like as a determination result of step S104 described above, the control application 134 executes processing defined by the independent protocol schema such as corresponding processing, state transition, linking with 0 of content, or the like (step S105). Specifically, the control application 134 executes the above-described processing in response to the protocol schema.

On the other hand, if the protocol schema of the hyperlink selected by the user of the information processing device 100 is the predefined HTTP or the like as the determination result of step S104 described above, the control application 134 next determines whether or not the protocol schema of the hyperlink is a protocol schema processable by the web browser 136 (step S106).

If the protocol schema of the hyperlink is the protocol schema processable by the web browser 136 as a determination result of step S106 described above, the control application 134 directly passes processing to the web browser 136 (step S107). On the other hand, if the protocol schema of the hyperlink is not the protocol schema processable by the web browser 136, the control application 134 directly passes the processing to the operating system 132 (step S108).

If the hyperlink is selected by HTML content, the control application 134 determines whether or not the selected hyperlink is based on a protocol schema independently specified by the content providing system 1, so that the web browser 136 and the control application 134 can be seamlessly linked without involving the operating system 132.

In general HTML content, a hyperlink is determined by the web browser. The web browser performs page transition or invokes an external function, for example, as designated by "mailto:" or the like (for example, execution of a mailer).

On the other hand, by applying a hook by a layer of the control application 134 once and checking whether or not a protocol schema designated by the user of the information processing device 100 is independently defined by the content providing system 1 in an exemplary embodiment, a link directed to a function unit of the control allocation 134 can be realized and a function can be controlled via a hyperlink included in HTML content, which is generated by the content server 10.

An operation of the information processing device 100 according to an exemplary embodiment has been described using FIG. 6.

<2. Summary>

According to an exemplary embodiment as described above, HTML content including a hyperlink by an independent protocol schema is generated by the content server 10 and is transmitted to the information processing device 100. In the information processing device 100, which displays HTML content, the control application 134 hooks the selection of a hyperlink by the user of the information processing device 100.

The control application 134 determines whether or not a protocol schema of a selected hyperlink is a specified schema or a schema independently specified by the content providing system 1. In response to the protocol schema of the hyperlink, the control application 134 decides content to be processed by the web browser 136, content to be processed by itself, or content to be processed by the operating system 132, and passes processing to the web browser 136 or the operating system 132, if necessary.

Thereby, seamless linking of the web browser 136 and the control application 134 is possible. By building HTML content as described above, the content server 10 can dynamically perform the functional configuration of an application as well as the generation of a content layout or script function. Further, a manufacturer of HTML content can focus on greatly valuable content for the user, how to show content, and providing of content in a layer of HTML content. It is possible to provide content having advantages of both of content by HTML and content by an application.

According to some exemplary embodiments, the content server 10 can process and manage a configuration of an application function as well as how to show content. Accordingly, an adaptive provision of a content-related function or an effective service provision of a function support or content recommendation based on a function provided in the content server 10 is possible.

By building HTML content by the content server 10 as described above, it is unnecessary to describe a function by a script directed to HTML content and functional linking by a simple link description is possible. Further, it is possible to solve a problem in terms of security since the content server 10 and the information processing device 100 operate as a pair.

It should be understood by those skilled in the art that various modifications, combinations, sub-combinations and alterations may occur depending on design requirements and other factors insofar as they are within the scope of the appended claims or the equivalents thereof.

For example, the operating system 132 has been described as an example of basic software for in the above-described exemplary embodiment, but embodiments are not limited to this example. For example, the techniques described herein can be equally applied even when the above-described control application or web browser is executed in a software framework executed under the operating system.

The present application contains subject matter related to that disclosed in Japanese Priority Patent Application JP 2010-119045 filed in the Japan Patent Office on May 25, 2010, the entire content of which is hereby incorporated by reference.

What is claimed is:

1. A method of performing processing based on a selected link, the method comprising:
   determining, using processor running a control application, whether the selected link is of a first type or of a second type;
   processing, using a processor, the selected link;
   when the selected link is of the first type, the selected link is configured for providing content using a markup language, and the control application causes processing associated with the selected link to be performed by a browser, wherein the control application is separate from the browser; and
   when the selected link is of the second type, the selected link is configured for at least one of transmitting content, reproducing content, and reading a content list, and the control application causes processing associated with the selected link to be performed by a module different from the browser,
   wherein the browser is executed by the control application and the control application is executed by an operating system,
   wherein, when the selected link is of the second type, the control application causes a functional link region to be displayed,
   wherein the functional link region comprises a plurality of visual elements that are selectable by a user,
   wherein the method further comprises receiving information identifying a selected visual element and performing processing associated with the selected link at least partially based on the selected visual element, and
   wherein the plurality of visual elements include a first visual element identifying a first display apparatus that is selectable by the user for display of content associated with the selected link, and wherein the processing comprises causing the content associated with the selected link to be transmitted to the first display apparatus in response to the user's selection of the first visual element of the functional link region, wherein the first display apparatus is selectable by the user by dragging an icon to the first visual element.

2. An apparatus, comprising:
   a processor configured to run a browser, a control application and an operating system, the processor configured to determine, using the control application, whether a selected link is of a first type or of a second type, wherein the processor is further configured to process the selected link, wherein,
   when the selected link is of the first type, the selected link is configured for providing content using a markup language, and the control application causes processing associated with the selected link to be performed by the browser, wherein the control application is separate from the browser,
   when the selected link is of the second type, the selected link is configured for at least one of transmitting content, reproducing content, and reading a content list, and the control application causes processing associated with the selected link to be performed by a module different from the browser, and
   wherein the browser is executed by the control application and the control application is executed by the operating system,
   wherein, when the selected link is of the second type, the control application causes a functional link region to be displayed,
   wherein the functional link region comprises a plurality of visual elements that are selectable by a user,
   wherein the apparatus is configured to receive information identifying a selected visual element and to perform processing associated with the selected link at least partially based on the selected visual element, and
   wherein the plurality of visual elements include a first visual element identifying a first display apparatus that is selectable by the user for display of content associated with the selected link, and wherein the processing comprises causing the content associated with the selected link to be transmitted to the first display apparatus in response to the user's selection of the first visual element of the functional link region, wherein the first display apparatus is selectable by the user by dragging an icon to the first visual element.

3. The apparatus of claim 2, wherein, when the selected link is of the second type, the control application causes processing associated with the link to be performed by the operating system.

4. The apparatus of claim 2, wherein the control application hooks the selected link.

5. An apparatus, comprising:
a processor configured to run an operating system, a control application, and a browser,
wherein the control application is separate from the operating system and the browser,
wherein the control application determines whether a selected link is of a first type or of a second type,
wherein the processor is further configured to process the selected link,
wherein the processor selects which of the browser, control application, or operating system is to perform processing associated with the selected link based on whether the selected link is of the first type or of the second type, and
wherein,
when the selected link is of the first type, the selected link is configured for providing content using a markup language, and the control application causes processing associated with the selected link to be performed by the browser,
when the selected link is of the second type, the selected link is configured for at least one of transmitting content, reproducing content, and reading a content list, and the control application causes processing associated with the selected link to be performed by a module different from the browser,
wherein the browser is executed by the control application and the control application is executed by the operating system,
wherein, when the selected link is of the second type, the control application causes a functional link region to be displayed,
wherein the functional link region comprises a plurality of visual elements that are selectable by a user,
wherein the apparatus is configured to receive information identifying a selected visual element and to perform processing associated with the selected link at least partially based on the selected visual element, and
wherein the plurality of visual elements include a first visual element identifying a first display apparatus that is selectable by the user for display of content associated with the selected link, and wherein the processing comprises causing the content associated with the selected link to be transmitted to the first display apparatus in response to the user's selection of the first visual element of the functional link region, wherein the first display apparatus is selectable by the user by dragging an icon to the first visual element.

6. A non-transitory computer readable storage device having stored thereon instructions, which, when executed, perform a method of processing based on a link, the method comprising:
configuring and displaying a user interface;
receiving content using a markup language from a content server over a network;
rendering the content using the markup language;
determining, using a processor running a control application, whether a link in the content using the markup language is selected;
in response to determining that the link is selected, determining, using a control application executed by the processor, whether a protocol schema of the selected link is an independent protocol schema defined for an operation of the control application;
in response to determining that the protocol schema of the selected link is the independent protocol schema defined for operation of the control application, processing the selected link using the control application executed by the processor;
in response to determining that the protocol schema of the selected link is not the independent protocol schema defined for the operation of the control application, determining, using the control application executed by the processor, whether the protocol schema of the selected link is a protocol schema processable by a browser, wherein the control application is separate from the browser;
in response to determining that the protocol schema of the selected link is the protocol schema processable by the browser, processing the selected link using the browser executed by the processor; and
in response to determining that the protocol schema of the selected link is not the protocol schema processable by the browser, processing the selected link using an operating system executed by the processor,
wherein the browser is executed by the control application and the control application is executed by the operating system,
wherein, when the protocol schema of the selected link is not the protocol schema processable by the browser, the control application causes a functional link region to be displayed,
wherein the functional link region comprises a plurality of visual elements that are selectable by a user,
wherein the method further comprises receiving information identifying a selected visual element and performing processing associated with the selected link at least partially based on the selected visual element, and
wherein the plurality of visual elements include a first visual element identifying a first display apparatus that is selectable by the user for display of content associated with the selected link, and wherein the processing comprises causing the content associated with the selected link to be transmitted to the first display apparatus in response to the user's selection of the first visual element of the functional link region, wherein the first display apparatus is selectable by the user by dragging an icon to the first visual element.

* * * * *